US009317682B1

(12) United States Patent
Kopylov et al.

(10) Patent No.: US 9,317,682 B1
(45) Date of Patent: Apr. 19, 2016

(54) LIBRARY-BASED METHOD FOR INFORMATION FLOW INTEGRITY ENFORCEMENT AND ROBUST INFORMATION FLOW POLICY DEVELOPMENT

(71) Applicant: HRL Laboratories, LLC, Malibu, CA (US)

(72) Inventors: Alexei Kopylov, South Pasadena, CA (US); George Kuan, Westlake Drive, CA (US); Aleksey Nogin, Fresno, CA (US)

(73) Assignee: HRL Laboratories, LLC, Malibu, CA (US)

( * ) Notice: Subject to any disclaimer, the term of this patent is extended or adjusted under 35 U.S.C. 154(b) by 44 days.

(21) Appl. No.: 13/707,607

(22) Filed: Dec. 7, 2012

(51) Int. Cl.
*G06F 21/44* (2013.01)
*G06F 21/53* (2013.01)
*H04L 29/06* (2006.01)

(52) U.S. Cl.
CPC ............... *G06F 21/53* (2013.01); *H04L 63/20* (2013.01)

(58) Field of Classification Search
CPC ......... G06F 21/577; G06F 21/50; G06F 9/44; G06F 8/437; G06F 21/53
USPC .......................................................... 726/1
See application file for complete search history.

(56) References Cited

U.S. PATENT DOCUMENTS

| | | | |
|---|---|---|---|
| 2005/0055565 A1* | 3/2005 | Fournet et al. ................. 713/200 |
| 2007/0112847 A1* | 5/2007 | Dublish et al. ............ 707/103 R |
| 2007/0136207 A1* | 6/2007 | Davydov et al. ................. 705/57 |
| 2010/0192129 A1* | 7/2010 | Langworthy et al. ......... 717/126 |
| 2011/0185433 A1* | 7/2011 | Amarasinghe .......... G06F 21/53 726/25 |
| 2012/0023486 A1* | 1/2012 | Haviv et al. .................... 717/126 |
| 2012/0131670 A1* | 5/2012 | Artzi et al. ....................... 726/22 |
| 2012/0159619 A1* | 6/2012 | Berg et al. ......................... 726/22 |
| 2013/0086686 A1* | 4/2013 | Pistoia et al. .................... 726/25 |
| 2013/0132932 A1* | 5/2013 | Van Rozen ..................... 717/124 |
| 2014/0007184 A1* | 1/2014 | Porras ..................... G06F 21/53 726/1 |

OTHER PUBLICATIONS

Sabelfeld and Sands. Dimensions and principles of declassification. Computer Security Foundations, 2005, pp. 255-269.

Niklaus Wirth. The programming language Pascal. Acta Information, 1:35-63, 1971.

(Continued)

*Primary Examiner* — Izunna Okeke
*Assistant Examiner* — Bryan Wright
(74) *Attorney, Agent, or Firm* — Tope-McKay & Associates

(57) ABSTRACT

Described is a system, method, and computer program product for preventing security flaws in untrusted computer source code by implementing information flow security in an existing programming language through use of an information flow security library. Confidentiality and integrity are encoded separately into the security information flow library. A security policy written in the host programming language is typechecked with a host programming language typechecker algorithm. Additionally, an untrusted module written in a restricted subset of the host programming language is typechecked with the host programming language typechecker algorithm. The untrusted modules cannot access confidential data in the host programming language. Typechecking of the untrusted modules enforces the security policy with the security information flow library.

12 Claims, 8 Drawing Sheets

(56) References Cited

OTHER PUBLICATIONS

Barbara Liskov et al. CLU Reference Manual, vol. 114 of Lecture Notes in Computer Science. Springer-Verlag, 1981. pp. 4, 8-11, 12-15, 37, 50-51, 81.
Niklaus Wirth. Programming in Modula-2, 3rd edition. Springer-Verlag, 1985, pp. 68, 148.
U.S. Department of Defense. Reference Manual for the Ada Programming Language. GPO 008-000-00354-9, 1980. Chapter 4.
A. Goldberg and D. Robson. Smalltalk-80: The language and its implementation. Addison Wesley, 1983. pp. 9-40.
Ralph E. Johnson. Type-checking Smalltalk. In Proceedings of Conference proceedings on Object-oriented programming systems, languages and applications, Portland, Oregon, United States. pp. 315-321. New York: ACM, 1986.
G.M. Birtwistle, O.-J. Dhal, B. Myhrhaug, and K. Nygaard. SIMULA Begin, Aurbach, 1973. pp. 371-374.
Robin Milner. A Theory of Type Polymorphism in Programming. Journal of Computer and System Sciences, 17:348-375, Aug. 1978.
Oukseh Lee and Kwangkeun Yi. Proofs about a Folklore Let-Polymorphic Type Inference Algorithm. ACM Transactions on Programming Languages and Systems, 20 (4), New York; ACM Press, 1998.
H.B. Curry. Modified Basic Functionality in Combinatory Logic. Dialectica, 23:83-92, 1969.
J. Roger Hindley. The principal type scheme of an object in combinatory logic. Transactions of the American Mathematical Society, 146: 29-40, 1969.
Russo et al. A library for light-weight information-flow security in Haskell. Haskell '08: Proceedings of the First Association for Computing Machinery (ACM) Special Interest Group on Programming Languages (SIGPLAN) symposium on Haskell, pp. 13-24, 2008.
Albert Diserholt. Providing integrity policies as a library in Haskell. Master's Thesis, 2010.
Askarov and Myers. A semantic framework for declassification and endorsement. ESOP'10 Proceedings of the 19th European conference on Programming Languages and Systems, pp. 64-84, 2010.
Zdancewic and Myers. Robust Declassification. Proceedings of the 14th IEEE Workshop on Computer Security Foundations, pp. 15-23, 2001.

* cited by examiner

LIBRARY-BASED METHOD FOR INFORMATION FLOW INTEGRITY ENFORCEMENT AND ROBUST INFORMATION FLOW POLICY DEVELOPMENT

BACKGROUND OF THE INVENTION (1) Field of Invention

The present invention relates to a system for preventing security flaws in computer source code and, more particularly, to a system for preventing security flaws in untrusted computer source code by implementing information flow security in an existing programming language through use of an information flow security library.

(2) Description of Related Art

Software security assurance aids in designing and implementing software that protects the data and resources contained in and controlled by that software. As software systems grow in complexity and expand support for third-party components (i.e., software components developed to be either freely distributed or sold by an entity other than the original vendor of the development platform), determination of the security properties becomes difficult, if not impossible. Once a component is granted access, the software system cannot easily regulate misuse and propagation of information through computations. Legitimate code may inadvertently pass along malicious or buggy input to sensitive components and/or leak secrets to unauthorized parties, or allow itself to be tricked into such. Furthermore, a malicious code may attempt to do the same while simultaneously covering up its activity.

As static analysis for security becomes standard in the systems development process, it becomes paramount that users adopt robust tools, tailored to the security demands in any product line that interfaces with third-party software.

Prior art in the field of security information flow in software falls into three general categories: dynamic taint analysis, secure information flow compilers, and information flow security libraries for general-purpose programming languages. Dynamic taint analysis instruments program code to detect suspect information flows at runtime, but this is often too late. It requires handling of security exceptions at runtime, which complicates the system and is not always feasible. Moreover, if the design error is only discovered during runtime, it is usually much harder and costlier to fix than if it were discovered earlier during the development process.

Secure information flow compilers detect security flaws at compile-time. However, most require re-implementation of software in a specialized programming language, which is a very expensive proposition. Only a few approaches based on embedding information flow security through a library exist. These approaches enable developers to design a system in existing, general-purpose programming languages that were not specifically designed to support information flow controls.

In the field of information flow security, it is well understood that integrity is a dual to confidentiality. That is, confidentiality can be used to enforce integrity. Confidentiality refers to preventing the disclosure of information to unauthorized individuals or systems, while integrity generally refers to the trustworthiness of the data. However, in the presence of source code values that are not instrumented for security analysis (i.e., values not labeled with security types, as would occur when an information flow security library is embedded into a general-purpose language), one needs to interpret integrity differently.

There does not exist, in the prior art, tools for information flow analysis which have all three of the following desired properties: compile-time (static) analysis of the code for security flaws; implementation as an added library for an existing language; and support for integrity where uninstrumented (unlabeled) values are considered to be of low integrity. Thus, a continuing need exists for a system that effectively implements and integrates the aforementioned tools.

SUMMARY OF THE INVENTION

The present invention relates to a system for information flow integrity enforcement comprising one or more processors and a memory having instructions such that when the instructions are executed, the one or more processors perform operations of implementing a security information flow library embedded in a host programming language. At least one security policy written in the host programming language is typechecked with a host programming language typechecker algorithm. At least one untrusted module written in a restricted subset of the host programming language is typechecked with the host programming language typechecker algorithm. The at least one untrusted module cannot access confidential data in the host programming language. Typechecking of the at least one untrusted module enforces the at least one security policy with the security information flow library.

In another aspect, confidentiality and integrity are encoded separately into the security information flow library.

In another aspect, at least one trusted module comprises labeled values comprising high confidentiality values and high integrity values, and wherein at least one untrusted module comprises unlabeled values comprising low confidentiality values and low integrity values.

In another aspect, the system further performs operations of allowing the unlabeled values to influence at least one of the high confidentiality values and the low confidentiality values, and preventing the unlabeled values from influencing the high integrity values.

In another aspect, the system further performs operations of allowing an untrusted module to compare a user input against a confidential element.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
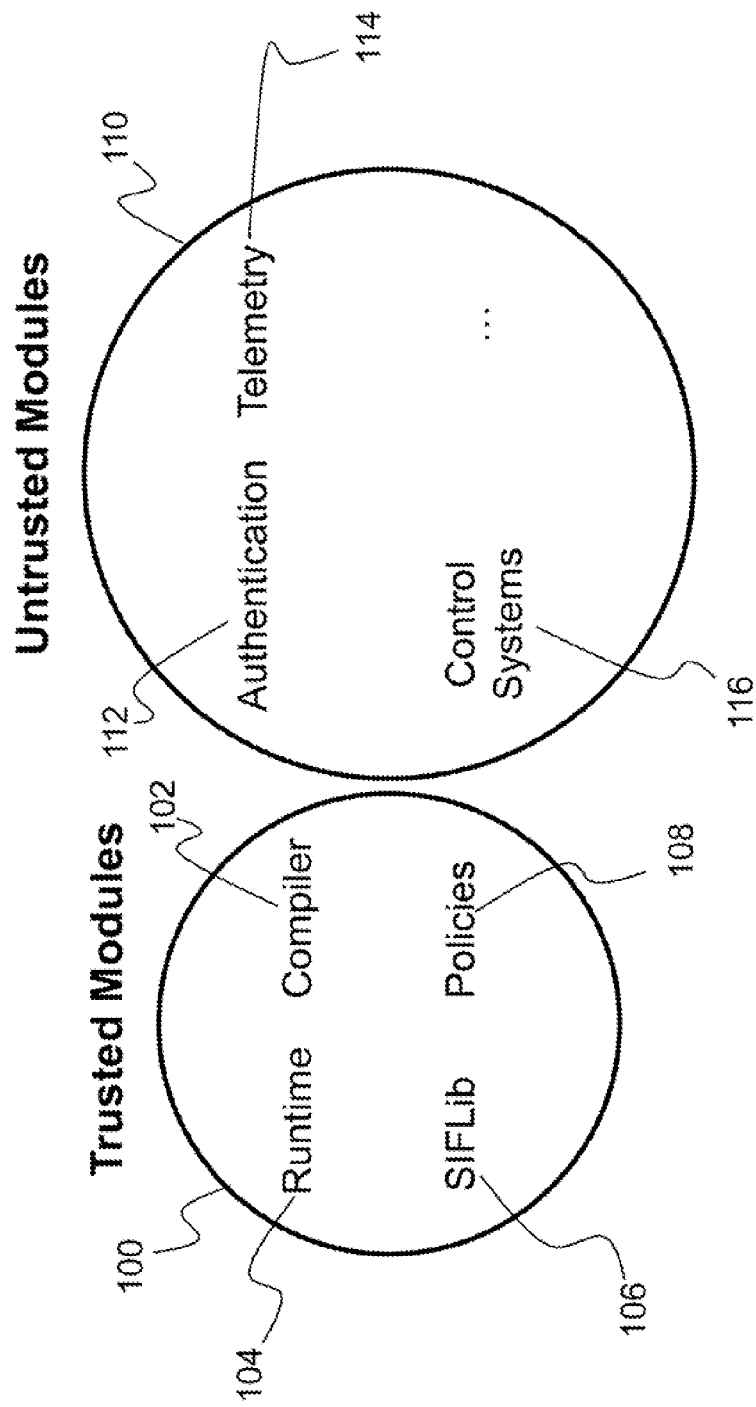
FIG. 1 is a diagram illustrating the partitioning of security systems into trusted modules and untrusted modules according to the present invention.

The present invention relates to a method for preventing security flaws in computer source code and, more particularly, to a method for preventing security flaws in untrusted computer source code by implementing information flow security in an existing programming language through addition of an information flow security library. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Subsequently, a description of various principal aspects of the present invention is provided. Finally, specific details of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number.

1. Sabelfeld and Sands. Dimensions and principles of declassification. *Computer Security Foundations*, 2005, pages 255-269.
2. Niklaus Wirth. The programming language Pascal. *Acta Informatica*, 1:35-63, 1971.
3. Barbara Liskov et al. *CLU Reference Manual*, volume 114 of Lecture Notes in Computer Science. Springer-Verlag, 1981.
4. Niklaus Wirth. *Programming in Modular-2*, 3rd edition. Springer-Verlag, 1985.
5. U.S. Department of Defense. *Reference Manual for the Ada Programming Language*. GPO 008-000-00354-9, 1980.
6. A. Goldberg and D. Robson. *Smalltalk-80: The language and its implementation*. Addison Wesley, 1983.
7. G. M. Birtwistle, O.-J. Dhal, B. Myhrhaug, and K. Nygaard. *SIMULA Begin*. Aurbach, 1973.
8. Robin Milner. A Theory of Type Polymorphism in Programming. *Journal of Computer and System Sciences*, 17:348-375, August 1978.
9. Oukseh Lee and Kwangkeun Yi. Proofs about a Folklore Let-Polymorphic Type Inference Algorithm. *ACM Transactions on Programming Languages and Systems*, 20 (4). New York: ACM Press, 1998.
10. H. B. Curry. Modified Basic Functionality in Combinatory Logic. *Dialectica*, 23:83-92, 1969.
11. J. Roger Hindley. The principal type scheme of an object in combinatory logic. *Transactions of the American Mathematical Society*, 146: 29-40, 1969.
12. Russo et al. A library for light-weight information-flow security in Haskell. *Haskell '08: Proceedings of the First Association for Computing Machinery (ACM) Special Interest Group on Programming Languages (SIGPLAN) symposium on Haskell*, pages 13-24, 2008.
13. Albert Diserholt. Providing integrity policies as a library in Haskell. Master's Thesis, 2010.
14. Askarov and Myers. A semantic framework for declassification and endorsement. *ESOP '10 Proceedings of the 19th European conference on Programming Languages and Systems*, pages 64-84, 2010.
15. Zdancewic and Myers. Robust Declassification. *Proceedings of the $14^{th}$ IEEE Workshop on Computer Security Foundations*, pgs. 15-23, 2001.

(2) PRINCIPAL ASPECTS

The present invention has three "principal" aspects. The first is a system for preventing security flaws in untrusted computer source code by implementing information flow security in an existing programming language as a library. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for preventing security flaws in untrusted computer source code by implementing information flow security in an existing programming language as a library. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) SPECIFIC DETAILS

The present invention, also referred to as SIFLib (secure information flow (SIF) library (Lib)), is a technique for preventing security flaws in untrusted computer source code by implementing information flow security in an existing programming language as a library. With the use of the invention described herein, the preservation of confidentiality can be guaranteed, even in the presence of declassification policies and source code not instrumented for security analysis, through the enforcement of separate confidentiality and integrity constraints.

The invention is a specific technique for embedding static information flow enforcement into pre-existing programming languages with no support for static information flow enforcement. By definition, static information flow cannot be enforced by runtime mechanisms. Specifically, the present invention is comprised of a treatment of integrity by encoding the notion in a non-standard data structure, which is more robust than prior approaches.

As will be described in detail below, SIFLib enforces confidentiality and trustworthiness of information propagation through all paths in program flow. Unlike prior approaches, it combines the library embedding approach with a robust trust analysis. This approach improves the state of the art by enabling detection of subtle declassification flaws that release more confidential information than intended when declassifying the result of computations on confidential information. Furthermore, this approach can enforce information flow security even in untrusted modules that have not been instrumented for security analysis. Since declassification is essential for many sensitive applications, and yet it is not practical to compel developers to instrument entire systems for security analysis, SIFLib enables information flow security analysis for larger, more realistic programs.

Given a particular security concern (e.g., passing untrustworthy inputs into sensitive components, leaking secrets), each piece of code in a system may be classified based on whether its flaws (whether accidental or deliberately inserted) have the potential of affecting the system's overall security. The code that does have such potential is commonly called trusted code, but not in the sense that it can be trusted. Unfortunately, the practice shows that very often it cannot. Rather, the code is trusted in the sense that it needs to be trusted in order to be able to have trust in the system's overall security. There is no way to verify the code, so one must trust that the developer wrote the code correctly. The rest is the code that is prevented ("shielded") from being capable of affecting the system's overall security. Prevention occurs through the system design, run-time checks, or through a code validation process that is guaranteed to find any potentially security-defeating flaws in such code and reject any flawed code. This code is commonly called "untrusted"—again, not in the sense that there is a reason to distrust it, but rather in the sense that it does not need to be trusted because it can be verified.

From the security perspective, it is highly desirable to reduce the amount of trusted code in a system as that essentially reduces the number of places where security flaws could "hide". Similarly, there are a number of practical advantages for allowing more code, and more kinds of code, to remain untrusted. One advantage is reducing the need for (potentially very costly) manual security review and validation of untrusted code. Another advantage is to allow for outsourcing of untrusted code to potentially non-100%-trustworthy parties (i.e., parties that can be potentially sloppy, or parties that could be potentially malicious). An additional advantage of allowing more code to remain untrusted is to enable various plug-in architectures, mobile code architectures, and other schemes where the system may be running code from external untrusted sources.

As illustrated in FIG. 1, in the present invention, a set of trusted modules 100 comprises a host programming language compiler module 102, a host language runtime module 104, a SIFLib security library module 106, and a security policies module 108, as non-limiting examples. The host programming language compiler module 102 is a software system for checking and translating human-readable source code into a virtual machine-executable representation ("bytecode") or machine-executable machine code. It is generally comprised of a front-end which parses and checks source code, an optimizer which performs a series of transformations on internal representations of the source code to improve performance in terms of execution time and memory usage, and a code generator which produces machine code. Non-limiting examples of compilers include the GNU Compiler Collection (GCC), Microsoft Visual C++, and the Java compiler. The GCC is distributed by the Free Software Foundation. Microsoft Visual C++ is produced by Microsoft Corporation, One Microsoft Way, Redmond, Wash. Java compiler is distributed by Oracle Corporation, 500 Oracle Parkway, Redwood Shores, Calif. 94065.

The host language runtime module 104 comprises all of the support that the programs written in the particular programming language require at running, such as virtual machine and/or garbage collector. A virtual machine is a software system that performs as an interpreter for executing software programs encoded in bytecode. The principal examples of virtual machines include the Java Virtual Machine. A garbage collector (GC) is a software system that automatically manages the allocation and deallocation of memory during software program execution (i.e., automatic memory management). A GC is responsible for determining when memory blocks are no longer in use by a software program and then recycling these memory blocks for future use by this or other software programs at an appropriate point in time. The Java Virtual Machine includes a garbage collector for managing its memory. The Java Virtual Machine is distributed by Oracle Corporation, 500 Oracle Parkway, Redwood Shores, Calif. 94065.

The security policies module 108 comprises a specialized code describing allowable declassification and endorsement. A security policy is a software-checkable encoding of an assignment of security types (e.g., confidentiality and integrity: high, low), labels to program elements (i.e., variables and functions), and restrictions on the propagation of information from program elements. Non-limiting examples of security policies used in the present invention are described in detail below.

An untrusted module can read high confidentiality variables. However, it cannot leak the high confidentiality information into the public domain, unless explicitly permitted by declassification policy. Similarly, untrusted modules cannot propagate low integrity variables into high integrity ones. Furthermore, these security levels must propagate through computations. For example, the result of adding a variable $x^H$ with high confidentiality to another variable $y^L$ with low confidentiality should have high confidentiality. It is the propagation of security levels through arbitrary computations that makes the analysis complex and interesting. There are, however, many cases where untrusted modules may legitimately need to operate on confidential data, or to have its outputs be promoted to a high integrity level. For example, an untrusted login program needs to verify that user input matches a confidential element, such as a password (see Literature Reference No. 1).

In the present invention, with reference to FIG. 1, the trusted modules 100 are limited to the host programming language compiler 102, host language runtime 104, SIFLib security library 106, and security policies 108. Non-limiting examples of untrusted modules 110 in the present invention include authentication 112, telemetry systems 114, and control systems 116. Authentication 112 includes login mechanisms of various forms that check that a user's credentials are valid by matching against a password database or a more sophisticated 2-factor system which combines password (i.e., something a user knows) with a token (i.e., something a user has such as a RSA SecurID® security token or a registered cell phone). Telemetry systems 114 include all forms of remote measurement systems, non-limiting examples of which include a global position system (GPS) tracking system or a cellular phone-based tracking system. Control systems 116 are software/hardware systems which supervise and control mechanical elements via a set of mechanical actuators.

Figure 2:
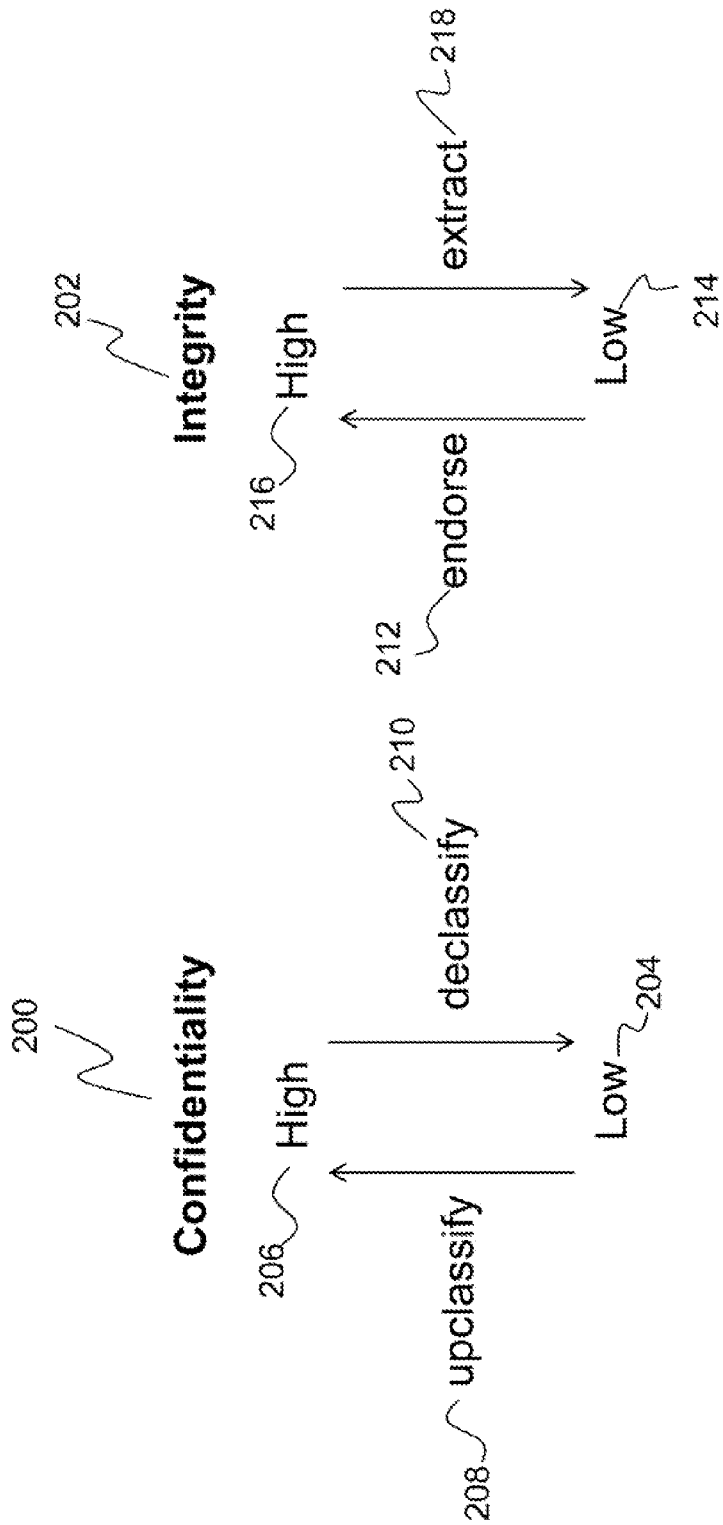
FIG. 2 is a diagram illustrating security dimensions according to the prior art.

FIG. 2 outlines a security policy mechanism according to the prior art. The security policy is responsible for determining how data can move between confidentiality levels 200 and integrity levels 202. For instance, to move from a low confidentiality level 204 to a high confidentiality level 206, data must be upclassified 208. In contrast, when moving from high confidentiality 206 to low confidentiality 204, data is declassified 210. Additionally, once the system can verify that data from an untrusted module are safe and meaningful, the integrity level 202 for the data can be upgraded (or endorsed 212) from a low integrity level 214 to a high integrity level 216. Data is extracted 218 when moving from a high integrity level 216 to a low integrity level 214. A security policy, a trusted module, can declassify 210 a high confidentiality expression (e.g., a computation on multiple pieces of information of varying confidentiality levels). Similarly, a security policy can endorse 212 low integrity information.

Figure 3:
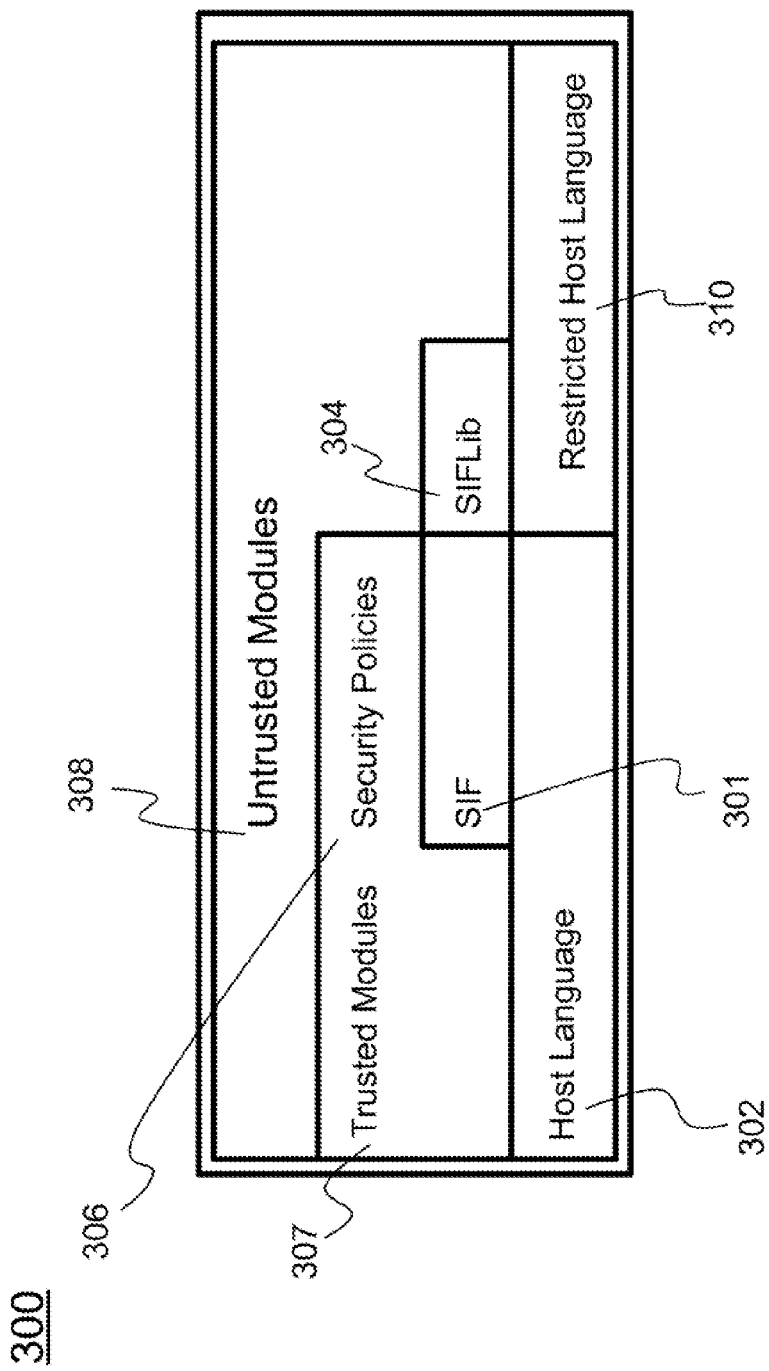
FIG. 3 is a diagram illustrating the framework of the library-based approach according to the present invention.

FIG. 3 depicts a framework 300 of the library-based approach of the present invention. As shown, one does not need to define a special purpose language to enforce information flow security. Instead, one can embed information flow security (SIF 301) into a general purpose programming language (i.e., the host language 302) using a library (SIFLib 304) and the host language's 302 own type system to enforce security in security policies 306 (which is a trusted module 307) and untrusted modules 308. The SIFLib 304 and security policies 306 are written in the host language 302, while the untrusted modules 308 are written in a restricted subset of the host language 310. Because direct representation of confidential information exists only in the unrestricted host language 302, untrusted modules 308 cannot access or reference this information directly. This approach enables developers to incrementally add information flow security (SIF 300) to existing programs by writing security policies 306 to orchestrate the information flow between untrusted modules 308. Although all parts of the system should be typechecked, it is the typechecking of the security policy 306 together with the restriction of untrusted modules 308 to a safe subset of the full host language (restricted subset of the host language 310) that guarantees information flow security properties.

Figure 4:
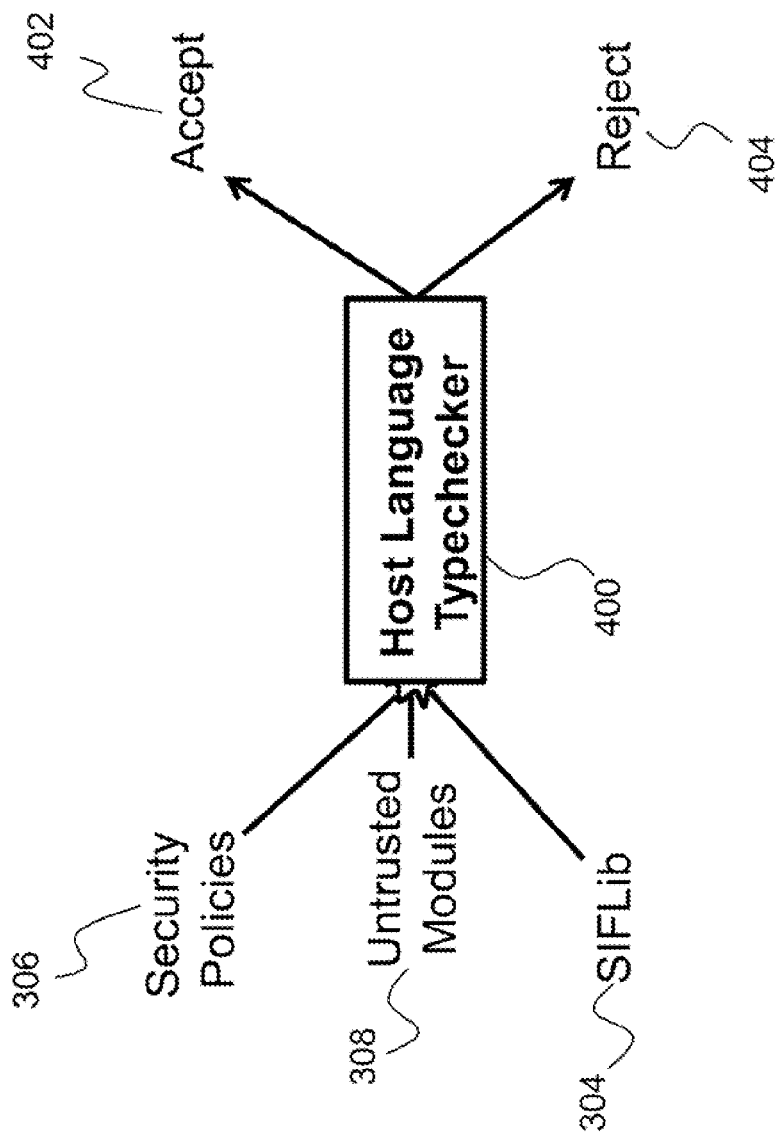
FIG. 4 is a diagram illustrating enforcement of information flow security polices using the library-based approach according to the present invention.

FIG. 4 is a diagram demonstrating the high-level operation of the library-based approach. The untrusted modules 308, security policies 306, and SIFLib 304 are typechecked using an existing programming language typechecker, referred to as the host language typechecking algorithm (typechecker 400), which has no built-in support for information flow security. The host language typechecking algorithm (typechecker 400) will either accept 402 or reject 404 the data. The typechecking step validates the source code against the security policies, therefore indirectly enforcing security. The source code is not executed at this point. Only if the code passes typechecking is the code executed and the library code is also executed, as shown in FIGS. 5 and 6 and described below.

The host language typechecking algorithm, which processes software source code to ensure that static types of program elements are consistent via varying forms of constraint solving, may take a variety of forms including typechecking algorithms for procedural languages (see Literature Reference Nos. 2, 3, 4, and 5), object-oriented languages (see Literature Reference Nos. 6 and 7), and Hindley-Milner-based type systems such as the Damas-Milner Algorithm W (see Literature Reference No. 8) and the Algorithm M (see Literature Reference No. 9), and Curry-Hindley-derived typecheckers (see Literature Reference Nos. 10 and 11). "Typecheckers" include both typecheckers for languages where all variables and values must be explicitly declared with their types (such as is the case in the C language) and type reconstruction (or type inference) systems which deduce types implicit from the context of the source code (such as in Hindley-Milner-based type systems). Both forms of typecheckers work by ensuring program elements (such as functions and values) are used in a fashion consistent with their types. For example, a function expecting an integer should not be applied to a character string.

In a programming language not tailored to information flow security, values are not labeled with security levels. One of the innovations in the present invention is that these unlabeled values can be safely and securely treated as being of low confidentiality and integrity. High confidentiality and integrity values must be explicitly labeled. This design is practical, because programs that are not information flow security aware can be incrementally converted by selectively labeling high confidentiality and integrity values. Moreover, in a typical program, most values are likely to have low confidentiality and integrity levels. The library-based approach described herein applies a host language typechecking algorithm to the security policy. The untrusted modules must also be typechecked. Because confidential values are abstract (i.e., opaque) while typechecking the untrusted modules, the confidential values cannot be accessed except through the security policy.

Figure 5:
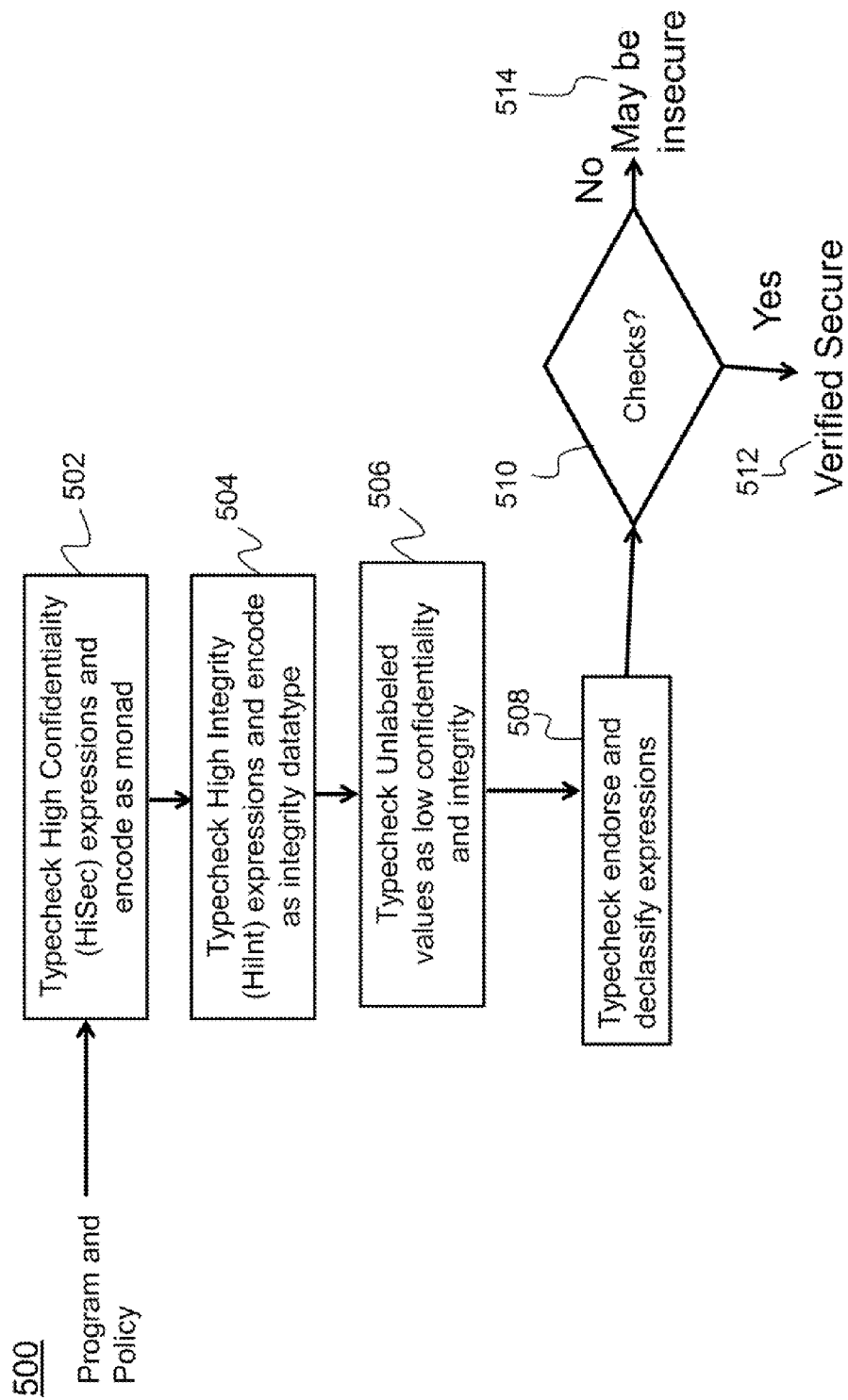
FIG. 5 is a flow diagram depicting typechecking operations according to the present invention.
Figure 6:
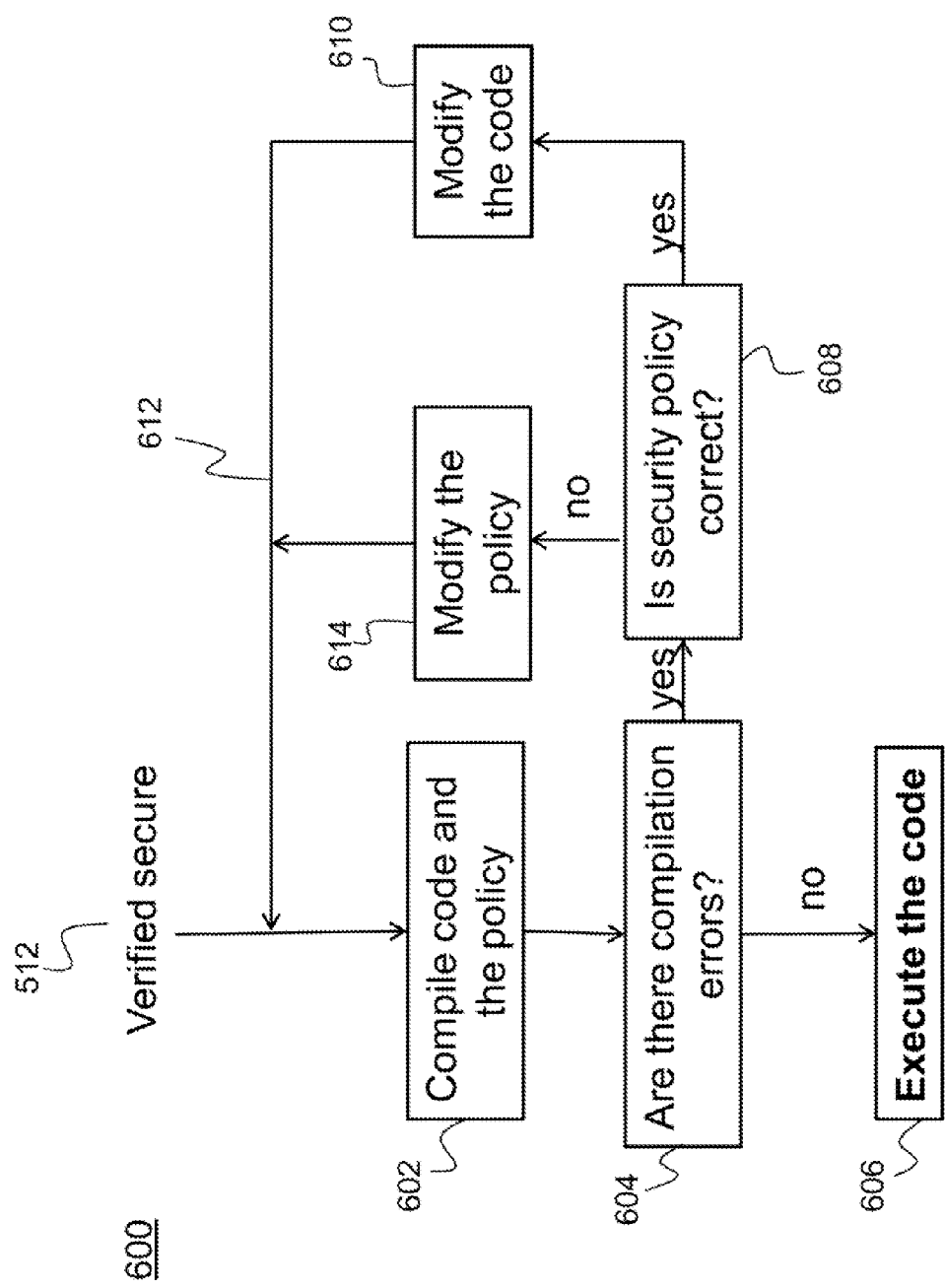
FIG. 6 is a flow diagram illustrating a system for preventing security flaws in computer source code according to the present invention.

FIG. 5 is a detailed flow diagram 500 depicting operations performed by the typechecker of the present invention to check the program (e.g., untrusted modules, SIFLib) and security policy. In step 502, high confidentiality (HiSec) expressions are typechecked and encoded as a monad, as will be described below. In the present invention, integrity is modeled separately from confidentiality. Therefore, in step 504, high integrity (HiInt) expressions are typechecked and encoded as an integrity datatype. In step 506, unlabeled values are typechecked and treated as low confidentiality and low integrity. In step 508, the system typechecks endorse and declassify expressions. In step 510, the system determines whether the operations checked came back clear. If so, the program and policy are considered secure (verified secure 512). If not, then the program and/or policy may be insecure 514.

FIG. 6 is a flow diagram 600 illustrating the steps involved for execution of code, provided that the code passes typechecking (shown in FIG. 5) and is verified secure 512. In step 602, the code and the security policy are compiled. In step 604, the system determines whether there are any compilation errors. If no errors exist, the code is executed in step 606. If errors exist, the system then determines if the security policy is correct in step 608. If the security policy is correct, then the code is modified in step 610, and a feedback loop 612 returns to step 602 of compiling the code and security policy. If the security policy is not correct, the security policy is modified in step 614, and the feedback loop 612 then restarts the process at step 602 of compiling the code and security policy again.

Russo et al. (see Literature Reference No. 12) use a library-based approach where both high and low confidential variables must be labeled. Their system does not confer information flow guarantees on unlabeled values. Confidential variables are put in a monad, a data structure that has the following property: everything that is put in a monad stays in monad, including any computations on what is in the monad.

In Russo et al. (see Literature Reference No. 12), if s is a confidentiality level, and t is a type, then Sec s t is a type of the values of type t with confidentiality level s. For example, Sec High Int is a type of integers with a High confidentiality level. Russo et al. also provides an implementation of Sec s t as a monad and a sample declassification policy. However, untrusted modules can abuse this sample policy. To be able to correctly specify the intended policy, one needs a notion of integrity such that an untrusted module cannot modify high integrity variables. Integrity has also been implemented as a library in the prior art. However, the implementation allows untrusted code to change high integrity values due to a design flaw, and thus does not enforce the intended semantics. Thus, there is a need for a safe library that provides strong integrity. The present invention is an implementation of such a library. SIFLib enforces a stronger notion of information flow security in the presence of declassification.

Albert Diserholt (see Literature Reference No. 13) described a Haskell library for integrity, which extended the library from Russo et al. (see Literature Reference No. 12) with primitives for encoding integrity policies. Similar to Russo et al., both high and low integrity variables must be explicitly labeled in order to analyze integrity. Information-flow policies for integrity are known to be dual to secrecy. Indeed, secrecy means that high confidentiality information cannot affect low confidentiality output, and integrity means that low integrity information cannot affect high integrity output. However, it is insufficient to consider integrity merely as secrecy by simply swapping the levels, (i.e., low integrity is higher in the lattice than high integrity).

Diserholt (see Literature Reference No. 13) does not specify what integrity level unlabeled values have. In fact, Diserholt treats unlabeled variables inconsistently. On the one hand, one can move information from public to any security level using the function:

return :: a → Sec s a

On the other hand, Diserholt provides a function that moves low integrity information to public according to the following:

public :: Sec Li a → a, where Li is the low integrity label. Combining these two functions, one can freely move any information from low integrity level to the high integrity one according to:

return ∘ public :: Sec Li a → Sec Hi a, where ∘ is a composition operator.

This clearly violates the desired security property, because the system should only allow information to flow in the opposite direction with respect to integrity levels, such as:

up :: Sec Hi a → Sec Li a

Note that this behavior is inherited from the fact that integrity is defined as a monad. Indeed, by definition, if Sec s is a monad, then there has to be a function return of the type a → Sec s a that moves public data into Sec s a.

The program described in Russo et al. allows an untrusted module to match against a confidential password up to three times. Because checking the password releases some information about it, one needs to use some declassification policy. The example given in Russo et al. declassifies the result of the expression spwd == c, where spwd is a password and c is any string, which can be done up to three times. However, in the library of Russo et al., an attacker may modify security values as long as the security values are kept at the same security level. Thus, an attacker may modify the variable spwd to depend on whether some condition on the confidential password is satisfied. Further, the attacker can then learn if the password satisfied this condition. Hence, the declassification policy provides more information to the attacker than was intended.

Under the SIFLib model of the present invention, uninstrumented (unlabeled) values may not affect high integrity variables. An innovation of the present invention is that confidentiality and integrity are modeled separately. Confidentiality continues to be modeled as a monad; however, integrity is modeled differently. The untrusted party is allowed to read high integrity values, but it may not modify it using uninstrumented values. Haskell language is used to describe SIFLib. In contrast to previous approaches, SIFLib provides only one operation on high integrity data:

extract :: HiInt t → t.

This operation allows one to read the high integrity values, but not to override them. The library does not provide a function of the type t→HiInt t.

One non-limiting aspect of this design is shown in an implementation that defines integrity and security, as listed below:

module SIF (HiSec( ), HiInt( ), HiSecInt, extract, declassify, endorse)
where
import Control.Monad
newtype HiSec t = HiSec t
instance Monad HiSec where
return = HiSec
(HiSec a) >>= f = f a

```
instance Functor HiSec where
    fmap = liftM
newtype HiInt t = HiInt t
extract :: HiInt t → t
extract (HiInt t) =t
type HiSecint t = HiSec (HiInt t)
declassify :: HiSec t → t
declassify (HiSec t) =t
endorse :: t → HiInt t
endorse = HiInt,
```
where "newtype HiSec t = HiSec t" denotes type of secret values of type t; "return =HiSec" denotes classify a value as a secret one; "(HiSec a) >>= f=fa" denotes apply a function to a secret value; "instance Functor HiSec" denotes any monad is a functor; "newtype HiInt t = HiInt t" denotes a type of high integrity values; "extract :: HiInt t → t" denotes extract high integrity value; "type HiSecInt t=HiSec (HiInt t)" denotes combine high security and high integrity type into one type; "declassify :: HiSec t → t" denotes a declassification function; and "endorse :: t → HiInt t" denotes an endorsement function.

For simplicity, in the aspect listed above, only one level for secrecy and one level for integrity are defined. For a type t, a type HiSec t is defined to be the set of high confidentiality values of type t. Further, type HiInt t is defined to represent high integrity values of type t. These types can be combined by defining the type HiSecInt t=HiSec (HiInt t) as the set of high confidentiality and integrity values of type t. Also defined are methods for declassification of confidential data and endorsement of low integrity data. These functions should not be exported to the untrusted code. The only module that untrusted code is allowed to import is the one below:

```
module SIFLib (
HiSec ( ), HiInt ( ),
extract, HiSecInt
) where
import SIF.
```

Askarov and Myers (see Literature Reference No. 14) formalize what an attacker can learn from the declassification policy (i.e., security policy). In order to implement a robust declassification policy, one needs to define integrity. Robust declassification is further defined by Zdancewic and Myers (see Literature Reference No. 15).

Using the implementation of integrity of the present invention, a robust declassification policy (security policy) can be defined as shown in the code below:

```
module Main (main) where
import Sec
import Login
checkPwd :: HiSecInt String → String → Bool checkPwd
    pwd guess
=extract (declassify pwd) == guess
main = login checkPwd,
``` where "login checkPwd" provides the login function with the checker, and "checkPwd :: HiSecint String → String → Bool checkPwd pwd guess" compares a secret password with a public guess.

The policy above allows an untrusted module to compare user input against a confidential password. The code below is a login program that uses this policy. The type system guarantees that this code will not leak any more secrets than what was intended.

```
module Login where
import SecLib import ReadPwd
login :: (HiSecInt String → String → Bool) → IO( )
login checkPwd = do putStrLn
    "Password:" guess ← getLine
    pwd ← readPwd if checkPwd
    pwd guess
        then putStrLn "Login succesfull" else
            putStrLn "Incorrect password",
``` where "login checkPwd = do putStrLn" prints passwork prompt; ""Password:" guess ← getLine" reads the password guess; "pwd ← readPwd" denotes read password from the password file (note that pwd is a secret value (HiSecInt String); and "if checkPwd pwd guess" applies supplied function to check the password.

Figure 7:
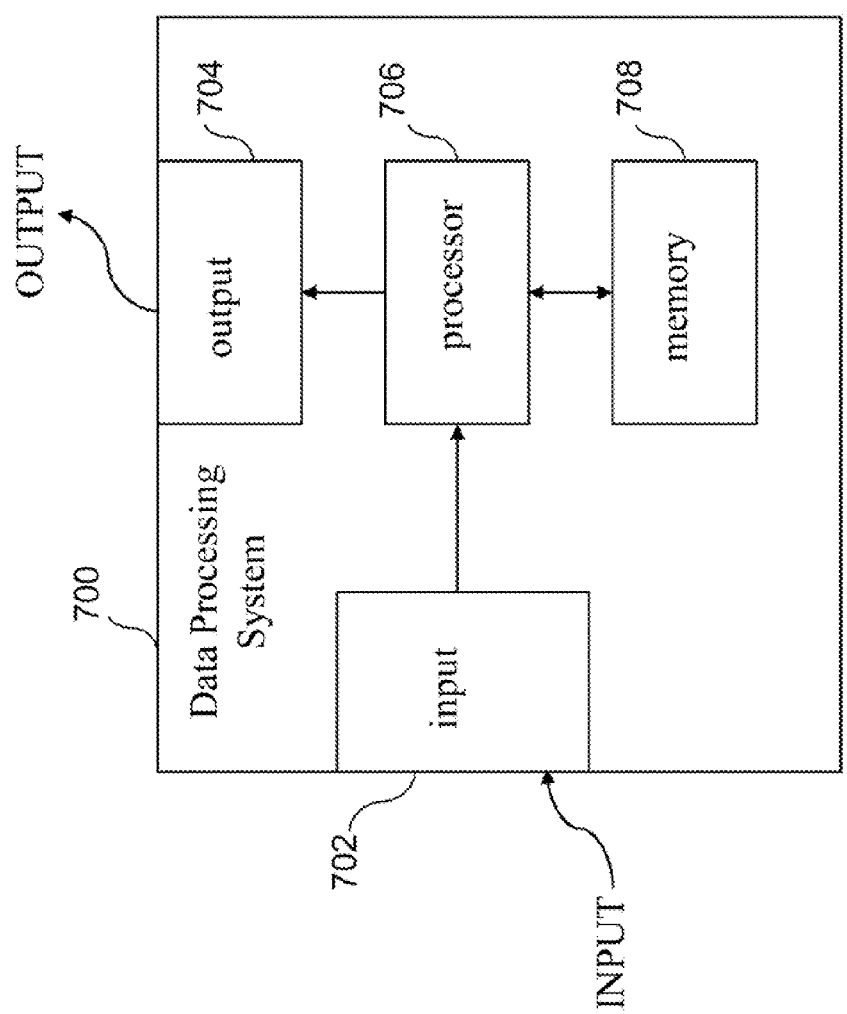
FIG. 7 is an illustration of a data processing system according to the present invention.

FIG. 7 illustrates a block diagram depicting components of a data processing system 700 (e.g., computer) incorporating the operations of the method described above and throughout the specification. The method utilizes a data processing system 700 for storing computer executable instructions (or instruction means) for causing a processor to carry out the operations of the above described method. The data processing system 700 comprises an input 702 for receiving information from a user. Information received may include input from devices such as cameras, scanners, keypads, keyboards, microphone, other peripherals such as storage devices, other programs, etc. The input 702 may include multiple "ports." An output 704 is connected with a processor 706 (or processors) for providing information for transmission to other data processing systems, to storage devices, to display devices such as monitors, to generating information necessary for delivery, and to other mechanisms for presentation in user-usable forms. The input 702 and the output 704 are both coupled with the processor 706, which may be a general-purpose computer processor or a specialized processor designed specifically for use with the present invention. The processor 706 is coupled with a memory 708 to permit storage of data and software to be manipulated by commands to the processor 706. The memory 708 includes instructions such that when the instructions are executed, the processor 708 (or processors) performs operations described above and throughout the specification.

Figure 8:
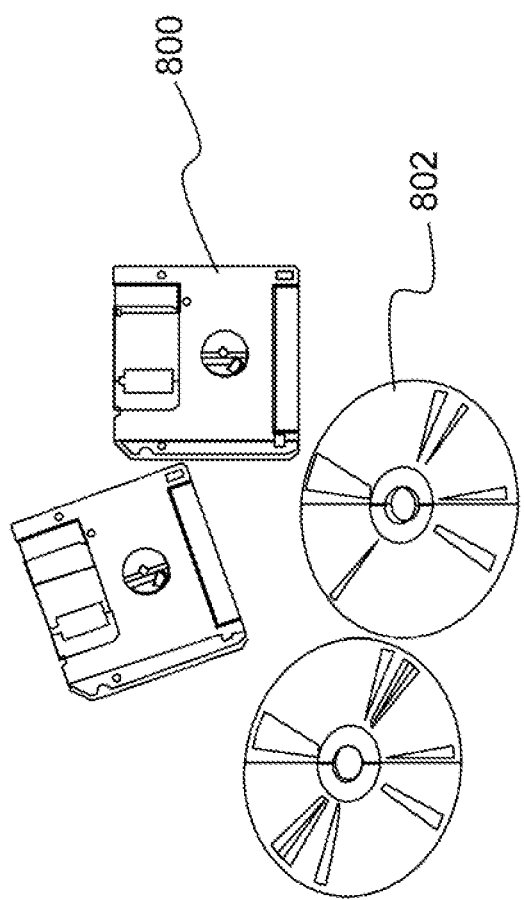
FIG. 8 is an illustration of a computer program product according to the present invention.

An illustrative diagram of a computer program product embodying the present invention is depicted in FIG. 8. As a non-limiting example, the computer program product is depicted as either a floppy disk 800 or an optical disk 802. However, as mentioned previously, the computer program product generally represents computer readable code (i.e., instruction means or instructions) stored on any compatible non-transitory computer readable medium.

Secure information flow can serve as an important foundation for future software systems. The SIFLib approach described herein is particularly applicable to closed systems and modular plug-in architectures, non-limiting examples of which include avionics, telemetry, and cyber and information solutions. The technique can improve software development and reduce development, testing, and integration costs by identifying security flaws early in the development process. It can also improve system modeling workflow by identifying bugs during the modeling process before code generation and testing.

The library-based approach to information flow security is widely applicable. As a non-limiting example, an automobile's electronic system may interface with many third party components. The library-based approach described herein can detect security flaws in the system during the modeling phase by analyzing third party components and security policies. Flaws related to integrity are especially important. Unsanitized inputs inadvertently or maliciously propagated may lead to unexpected system behaviors or leakage of privileged information, such as speed and encryption keys. The library-based approach detects any possibility of unsanitized inputs propagating into sensitive areas. On Internet-enabled systems that permit downloading and installing extensions and applications ("mobile code"), such as web browsers, cell phones, and other consumer electronic devices, the third-party extensions should be prohibited from compromising the entire system. The system can require that the mobile code be subject to a security policy, which can be verified by the present invention. The library-based approach of the present invention will prohibit mobile code from manipulating the rest of the system into divulging confidential information, such as credit card numbers, browsing histories, and user behavior, except as explicitly permitted by a security policy.

What is claimed is:

1. A system for preventing security flaws in computer source code, the system comprising:
   one or more processors and a non-transitory memory having instructions such that when the instructions are executed, the one or more processors perform operations of:
      implementing a security information flow library embedded in a host programming language;
      typechecking, with a host programming language typechecker algorithm, at least one security policy written in the host programming language;
      typechecking, with the host programming language typechecker algorithm, at least one untrusted module written in a restricted subset of the host programming language;
      wherein the at least one untrusted module cannot access confidential data in the host programming language;
      wherein typechecking of the at least one untrusted module enforces the at least one security policy with the security information flow library; and
      wherein confidentiality and integrity are encoded separately into the security information flow library; and
      incrementally adding information flow security to an existing computer program by implementing at least one security policy to direct information flow between untrusted modules.

2. The system as set forth in claim 1, wherein the one or more processors further perform an operation of typechecking at least one trusted module, wherein the at least one trusted module comprises labeled values comprising high confidentiality values and high integrity values, and wherein the at least one untrusted module comprises unlabeled values comprising low confidentiality values and low integrity values.

3. The system as set forth in claim 2, wherein the one or more processors further perform operations of:
   allowing the unlabeled values to influence at least one of the high confidentiality values and the low confidentiality values; and
   preventing the unlabeled values from influencing the high integrity values.

4. The system as set forth in claim 1, wherein the one or more processors further perform operations of allowing an untrusted module to compare a user input against a confidential element.

5. A computer implemented method for preventing security flaws in computer source code comprising:
   executing Instructions stored on a non-transitory memory, by a data processor, such that upon execution, the data processor performs operations comprising,
      implementing a security information flow library embedded in a host programming language;
      typechecking, with a host programming language typechecker algorithm, at least one security policy written in the host programming language;
      typechecking, with the host programming language typechecker algorithm, at least one untrusted module written in a restricted subset of the host programming language,
      wherein the at least one untrusted module cannot access confidential data in the host programming language;
      wherein typechecking of the at least one untrusted module enforces the at least one security policy with the security information follow library, wherein confidentiality and integrity are encoded separately into the security information flow library; and
      incrementally adding information flow security to an existing computer program by implementing at least one security policy to direct information flow between untrusted modules.

6. The method as set forth in claim 5, further comprising an act of causing the data processor to perform an operation of typechecking at least one trusted module, wherein the at least one trusted module comprises labeled values comprising high confidentiality values and high integrity values, and wherein the at least one untrusted module comprises unlabeled values comprising low confidentiality values and low integrity values.

7. The method as set forth in claim 6, further comprising an act of causing the data processor to perform operations of:
   allowing the unlabeled values to influence at least one of the high confidentiality values and the low confidentiality values; and
   preventing the unlabeled values from influencing the high integrity values.

8. The method as set forth in claim 5, further comprising an act of causing the data processor to perform an operation of allowing an untrusted module to compare a user input against a confidential element.

9. A computer program product for preventing security flaws in computer source code, the computer program product comprising computer-readable instructions stored on a non-transitory computer-readable medium that are executable by a computer having a processor for causing the processor to perform operations of:
   implementing a security information flow library embedded in a host programming language;
   typechecking, with a host programming language typechecker algorithm, at least one security policy written in the host programming language;
   typechecking, with the host programming language typechecker algorithm, at least one untrusted module written in a restricted subset of the host programming language;
   wherein the at least one untrusted module cannot access confidential data in the host programming language;
   wherein typechecking of the at least one untrusted module enforces the at least one security policy with the security information flow library; and
   wherein confidentiality and integrity are encoded separately into the security information flow library; and
   incrementally adding information flow security to an existing computer program by implementing at least one security policy to direct information flow between untrusted modules.

10. The computer program product as set forth in claim 9, further comprising instructions for causing the processor to perform an operation of typechecking at least one trusted module, wherein the at least one trusted module comprises labeled values comprising high confidentiality values and high integrity values, and wherein the at least one untrusted module comprises unlabeled values comprising low confidentiality values and low integrity values.

11. The computer program product as set forth in claim 10, further comprising instructions for causing the processor to perform operations of:
 allowing the unlabeled values to influence at least one of the high confidentiality values and the low confidentiality values; and
 preventing the unlabeled values from influencing the high integrity values.

12. The computer program product as set forth in claim 9, further comprising instructions for causing the processor to perform an operation of allowing an untrusted module to compare a user input against a confidential element.

* * * * *